United States Patent
Solomakha et al.

(10) Patent No.: US 10,360,275 B2
(45) Date of Patent: *Jul. 23, 2019

(54) SYSTEMS AND METHODS FOR OPTIMIZING THE SELECTION AND DISPLAY OF ELECTRONIC CONTENT

(71) Applicant: Oath Inc., Dulles, VA (US)

(72) Inventors: Dmytro Solomakha, Jersey City, NJ (US); Maggie J. Xiong, Roselle Park, NJ (US); Adam B. Denenberg, Rockville Centre, NY (US)

(73) Assignee: Oath Inc., Dulles, VA (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/625,744

(22) Filed: Jun. 16, 2017

(65) Prior Publication Data

US 2017/0286553 A1  Oct. 5, 2017

Related U.S. Application Data

(63) Continuation of application No. 14/300,645, filed on Jun. 10, 2014, now Pat. No. 9,710,559.

(51) Int. Cl.
| | | |
|---|---|---|
| *G06F 16/00* | (2019.01) | |
| *G06F 16/9535* | (2019.01) | |
| *G06F 16/2457* | (2019.01) | |
| *G06Q 30/02* | (2012.01) | |

(52) U.S. Cl.
CPC .... *G06F 16/9535* (2019.01); *G06F 16/24578* (2019.01); *G06Q 30/0242* (2013.01); *G06Q 30/0254* (2013.01); *G06Q 30/0277* (2013.01)

(58) Field of Classification Search
CPC ........................... G06Q 30/02; G06Q 30/0276

USPC ........................... 707/791, 796, 803
See application file for complete search history.

(56) References Cited

U.S. PATENT DOCUMENTS

| | | | |
|---|---|---|---|
| 6,353,822 B1 * | 3/2002 | Lieberman | G06F 17/30867 |
| 8,468,143 B1 * | 6/2013 | Oztekin | G06F 17/30554 |
| | | | 707/706 |
| 8,548,929 B1 | 10/2013 | Goodwin et al. | |
| 8,682,720 B1 | 3/2014 | Wills et al. | |
| 8,949,214 B1 | 2/2015 | Shah et al. | |
| 2008/0040265 A1 * | 2/2008 | Rackley, III | G06Q 20/02 |
| | | | 705/40 |

(Continued)

OTHER PUBLICATIONS

Extended Search Report for corresponding European Application No. 15171428.4, dated Oct. 19, 2015 (6 pages).

*Primary Examiner* — Hanh B Thai
(74) *Attorney, Agent, or Firm* — Bookoff McAndrews, PLLC

(57) ABSTRACT

Systems and methods are provided for optimizing displays in one or more user interfaces. An exemplary method may include retrieving web entries from a database and generating a plurality of candidates based on the retrieved web entries, where each web entry of the web entries is a clickable item that is displayed on the one or more user interfaces. Additionally, provide the plurality of candidates for display on the one or more user interfaces and determine click-through rates for each of the plurality of candidates. Thereafter, create a display pool of candidates to display from plurality of candidates based on the click-through rates and update the display pool of candidates responsive to retrieving additional web entries from the database.

20 Claims, 5 Drawing Sheets

(56) References Cited

U.S. PATENT DOCUMENTS

| | | | |
|---|---|---|---|
| 2008/0281827 A1* | 11/2008 | Wang | G06F 17/278 |
| 2009/0112690 A1 | 4/2009 | Brady | |
| 2010/0070448 A1 | 3/2010 | Omoigui | |
| 2010/0114789 A1 | 5/2010 | Dane | |
| 2010/0223252 A1* | 9/2010 | Broman | G06F 17/30867 |
| | | | 707/709 |
| 2010/0250361 A1 | 9/2010 | Torigoe et al. | |
| 2011/0035403 A1* | 2/2011 | Ismalon | G06F 17/3064 |
| | | | 707/769 |
| 2011/0066496 A1 | 3/2011 | Zhang et al. | |
| 2011/0082902 A1 | 4/2011 | Rottler et al. | |
| 2011/0196733 A1 | 8/2011 | Li et al. | |
| 2011/0196747 A1* | 8/2011 | Karidi | G06Q 30/02 |
| | | | 705/14.71 |
| 2011/0213655 A1 | 9/2011 | Henkin et al. | |
| 2011/0238486 A1 | 9/2011 | Liu et al. | |
| 2011/0251887 A1 | 10/2011 | Sanjoy et al. | |
| 2013/0030907 A1 | 1/2013 | Lyon | |
| 2013/0187926 A1 | 7/2013 | Silverstein et al. | |
| 2014/0095477 A1* | 4/2014 | Wadhwa | G06F 17/30672 |
| | | | 707/722 |
| 2014/0123179 A1 | 5/2014 | Wang | |
| 2014/0214790 A1* | 7/2014 | Vaish | G06F 17/30867 |
| | | | 707/709 |
| 2014/0289141 A1* | 9/2014 | Kolber | G06O 10/1053 |
| | | | 705/321 |
| 2015/0039416 A1* | 2/2015 | Sullivan | G06Q 30/0244 |
| | | | 705/14.43 |
| 2015/0356184 A1 | 12/2015 | Solomakha et al. | |

\* cited by examiner

SYSTEMS AND METHODS FOR OPTIMIZING THE SELECTION AND DISPLAY OF ELECTRONIC CONTENT

CROSS-REFERENCE TO RELATED APPLICATION

This application is a continuation of and claims the benefit of priority to pending U.S. application Ser. No. 14/300,645, filed Jun. 10, 2014, which is incorporated herein by reference in its entirety.

TECHNICAL FIELD

Various embodiments of the present disclosure relate generally to optimizing the selection and display of electronic content. More specifically, particular embodiments of the present disclosure relate to systems and methods for optimizing the selection and display of online content in one or more mobile or browser user interfaces to achieve higher click-through rates for the displayed content.

BACKGROUND

Typically, online publishers, such as online media companies and other publishers of articles, stories, and other electronic content, provide their content on online web pages. Often these web pages contain links to additional content adjacent to the primary content being displayed. For example, a web page providing a news article may include additional links to related news articles or advertisements. The prevalent way to present links related to the primary content of a web page is based on similarity in topics, e.g., on an ad-hoc basis, and/or based on a user's preferences. However, it can be difficult for a content provider to efficiently identify important or relevant links of content to provide along with the primary content on a web page without soliciting a user's preferences explicitly or by tracking a user's particular behavior.

SUMMARY OF THE DISCLOSURE

Embodiments disclose systems and methods for optimizing the display of content in user interfaces, such as the display of content contained within web pages on mobile devices, computers, set top boxes, or the like.

According to some embodiments, computer-implemented methods are disclosed for optimizing displays in one or more user interfaces. In an exemplary method, the method includes retrieving web entries from a database, each web entry of the web entries being a clickable item that is displayed on the one or more user interfaces and generating a plurality of candidates based on the retrieved web entries, each candidate of the plurality of candidates comprising one or more of the web entries. The method further includes providing the plurality of candidates for display on the one or more user interfaces, and determining click-through rates for each of the plurality of candidates. The method may also include selecting, from the plurality of candidates, a display pool of candidates to display based on the click-through rates, and updating the display pool of candidates responsive to retrieving additional web entries from the database.

According to some embodiments, systems are disclosed for optimizing displays in one or more user interfaces. One system includes a memory having processor-readable instructions stored therein and a processor configured to access the memory and execute the processor-readable instructions, which when executed by the processor configures the processor to perform a method. In an exemplary method, the method includes retrieving web entries from a database, each web entry of the web entries being a clickable item that is displayed on the one or more user interfaces and generating a plurality of candidates based on the retrieved web entries, each candidate of the plurality of candidates comprising one or more of the web entries. The method further includes providing the plurality of candidates for display on the one or more user interfaces, and determining click-through rates for each of the plurality of candidates. The method may also include selecting, from the plurality of candidates, a display pool of candidates based on the click-through rates, and updating the display pool of candidates responsive to retrieving additional web entries from the database.

According to some embodiments, a non-transitory computer readable medium is disclosed as storing instructions that, when executed by a computer, cause the computer to perform a method, the method including retrieving web entries from a database, each web entry of the web entries being a clickable item that is displayed on the one or more user interfaces and generating a plurality of candidates based on the retrieved web entries, each candidate of the plurality of candidates comprising one or more of the web entries. The method further includes providing the plurality of candidates for display on the one or more user interfaces, and determining click-through rates for each of the plurality of candidates. The method may also include selecting, from the plurality of candidates, a display pool of candidates to display based on the click-through rates, and updating the display pool of candidates responsive to retrieving additional web entries from the database.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1:
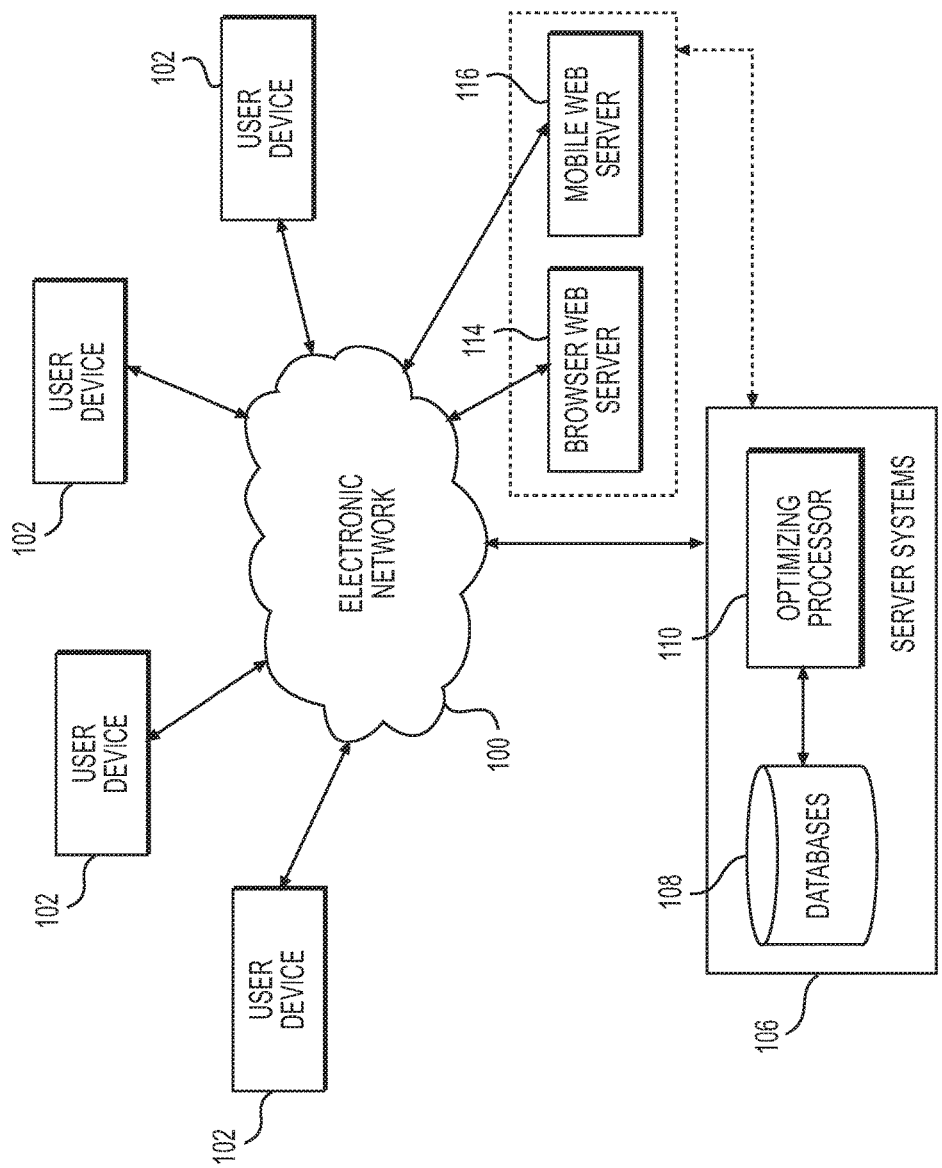
FIG. 1 is a schematic diagram of a network environment for optimizing displays in one or more user interfaces, according to an embodiment of the present disclosure.

While the present disclosure is described herein with reference to illustrative embodiments for particular applications, it should be understood that embodiments of the present disclosure are not limited thereto. Other embodiments are possible, and modifications can be made to the described embodiments within the spirit and scope of the teachings herein, as they may be applied to the above-noted field of the present disclosure or to any additional fields in which such embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In view of the challenges associated with the conventional techniques outlined above, systems and methods are disclosed herein for optimizing the display of web entries on a web page according to their performance, such as according to principles consistent with "genetic algorithms" and "natural selection." That is, an iterative process may be used to optimize the display of web entries on a web page. A web entry refers to a display on a web page of an article, photo, video, or representative thumbnails, each of which may be clicked or selected by a user. It should be appreciated that variations of the word "click," as used herein, should be construed to encompass any user selection, such as a touch, swipe, gesture, etc. The system may optimize the best set of web entries to display that would lead to a high click-through rate. The process may entail generating candidates (various combinations of web entries) to display on a web page, and evaluating each of the candidates based on click-through rates for the candidate based on similar display conditions during a trial period. The most successful candidates from the trial period may then be featured prominently in any future displays that are generated for the web page. Any new entries to the pool of web entries may lead to the generation of additional candidates for an ongoing iterative process of optimization. For example, on a news website, there may be web entries related to related stories or articles along with the primary content being displayed. A particular combination of web entries may have a higher click-through rate during the trial period. Therefore, going forward, that combination of articles with a higher click-through rate would be displayed more often. However, when new articles are added to the pool of web entries, further optimization may occur taking into account the new web entries.

Accordingly, application of a genetic algorithm, which mimics the process of natural selection, allows for an optimization of the display pool of candidate, that is, it allows for display pool of candidates to continually consist of candidates that are likely to have the highest click-through rates. Accordingly, after the first generation of pool of candidates from all possible candidates, each subsequent generation leads to the addition of any new candidates with high click-through rates and removal of candidates with relatively lower click-through rates from the display pool of candidates.

In an embodiment, the optimized display pool of candidates that are projected to lead to higher click-through rates allows for preservation of individual privacy. Specifically, exemplary embodiments take into account click-through rates of various users to which content is being displayed. Accordingly, the exemplary embodiments do not track an individual's preferences or behavior, but rather, involve optimizing based on behaviors of a group of particular types of users.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a schematic diagram of an exemplary network environment in which various user interfaces may display web pages, according to an embodiment of the present disclosure. As shown in FIG. 1, the environment may include a plurality of user or client devices 102 that are communicatively coupled to each other as well as a plurality of server systems 106, a browser web server 114, and/or a mobile web server 116 via an electronic network 100. Electronic network 100 may include one or a combination of wired and/or wireless electronic networks. Network 100 may also include a local area network, a medium area network, or a wide area network, such as the Internet.

In one embodiment, each of user or client devices 102 may be any type of computing device configured to send and receive different types of content and data to and from various computing devices via network 100. Examples of such a computing device include, but are not limited to, a desktop computer or workstation, a laptop computer, a mobile handset, a personal digital assistant (PDA), a cellular telephone, a network appliance, a camera, a smart phone, an enhanced general packet radio service (EGPRS) mobile phone, a media player, a navigation device, a game console, a set-top box, or any combination of these or other types of computing devices having at least one processor, a local memory, a display (e.g., a monitor or touchscreen display), one or more user input devices, and a network communication interface. The user input device(s) may include any type or combination of input/output devices, such as a keyboard, touchpad, mouse, touchscreen, camera, and/or microphone.

In one embodiment, each of the user or client devices 102 may be configured to execute a web browser or mobile browser installed for displaying various types of content and data received from any of server systems 106 and/or web servers 114 and 116 via network 100. Server systems 106 in turn may be configured to receive data related to user interaction with the web browsers or mobile browsers displayed in the user or client devices 102. The user interaction may occur at each device 102 through an interface provided on a web page loaded within the browser executable at each device. For example, server systems 106 may receive data related to selection or clicking of an item displayed on a web page. This may include a web entry or a candidate that presented on a web page. A web entry may refer to a clickable item that is presented on a web page alongside the primary content of the web page. A candidate may refer to a collection of one or more web entries that may be presented on a web page alongside the primary content of the web page. Further details with respect to a web entry and a candidate are provided in the explanation accompanying FIG. 2.

While browser web server 114 and mobile web server 116 are shown separately in FIG. 1, it should be noted that web servers 114 and 116 may be implemented using a single server device or system. In an example, such a single server may be a web server that is configured to provide different versions of a web page and associated content to each of user/commenter devices 102 according to the type of device or web browser executable at the device. The different versions of the web page may include, for example, a desktop version and a mobile version, for which the web page content may be formatted appropriately for display via the particular type of browser at the device. Further, any of the devices or functionality of server systems 106, browser web server 114, and/or a mobile web server 116 may be combined together or separated, and may be operated by a single administrative entity, or outsourced to one or more other entities, such as a web hosting entity, web storage entity, and/or cloud computing service, possibly disposed remotely of each other.

Also, as shown in FIG. 1, server systems 106 may include one or more databases 108. In an embodiment, databases 108 may be any type of data store or recording medium that may be used to store any type of data. For example, databases 108 may store web entries, candidates, user-generated content (e.g., articles, advertisement, etc.), or any other additional data that may be used to generate displays in user interfaces. Databases 108 may also store information related to the web entries, candidates, and user-generated content. Methods such as transmissions, RSS feeds, and automatic downloads may be used to acquire content for web pages that is to be displayed on various web pages.

Additionally, as shown in the example of FIG. 1, server systems 106 may include an optimizing processor 110. In an embodiment, optimizing processor 110 may be configured to execute a process for optimizing displays in order to increase a click-through rate for entries displayed on a web page, as will be described in further detail below. The optimization method may, for example, continue to constantly update selectable or clickable web entries that are displayed in web pages being accessed in browsers of various user or client devices 102.

In an embodiment, optimizing processor 110 may be configured to receive instructions and content from various sources including user or client devices 102 and store the received content within databases 108. In some implementations, any received data may be stored in the databases 108 in an encrypted form to increase security of the data against unauthorized access. Optimizing processor 110 or any additional processors within server systems 106 may also be configured to provide content to client or user devices 102 for displaying. The displayed content may include, for example, user-generated content that has been processed or received. For example, optimizing processor 110 may transmit web page content including an article or blog entry and a plurality of related images, thumbnails, links and additional selectable/clickable entries. In some embodiments, client devices 102 may be used by certain users to input or manage web content that is managed by optimizing processor 110. For example, content that is stored within servers systems 106 for display on user or client devices 102 may be accessed by a manager using one of the user or client devices 102.

Figure 2:
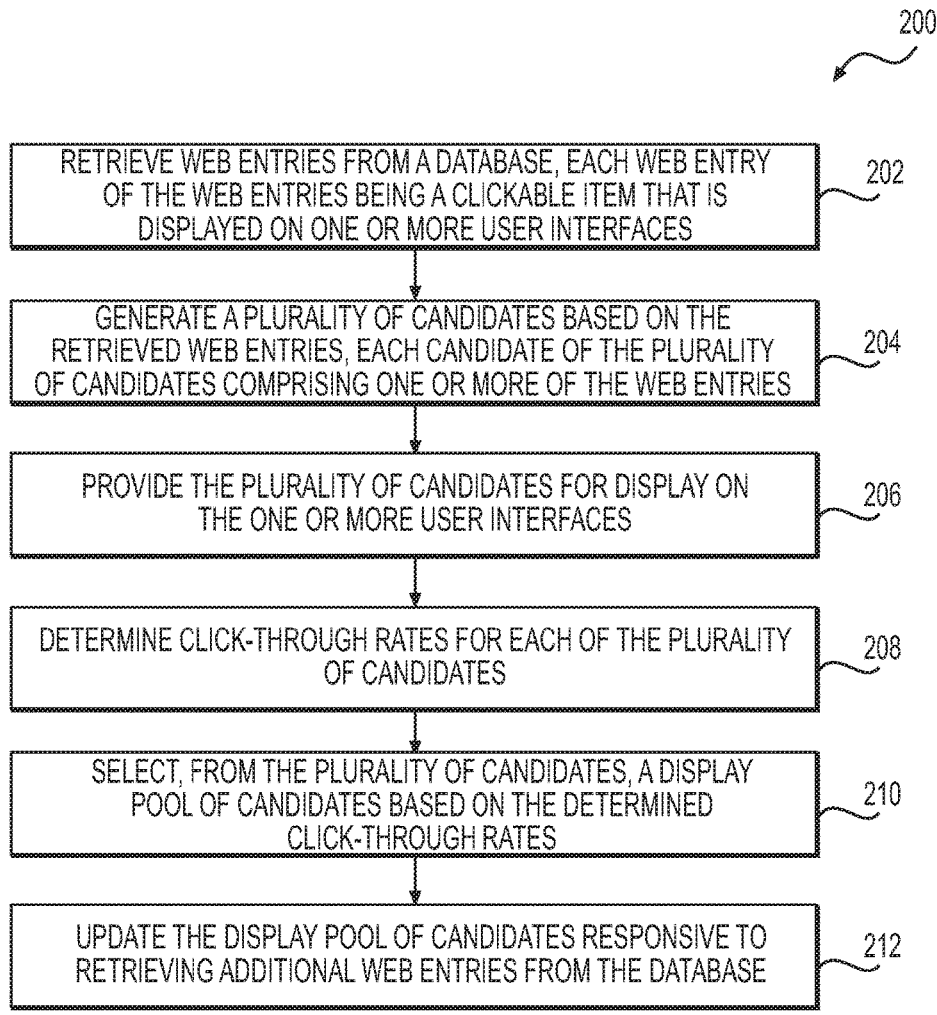
FIG. 2 is a flow diagram of an exemplary method for optimizing displays in one or more user interfaces, according to an embodiment of the present disclosure.

FIG. 2 is a flow diagram of a method 200 for optimizing displays in one or more user interfaces, according to an embodiment of the present disclosure. In an exemplary embodiment, the method may entail two general steps. One of ordinary skill in the art would comprehend that the method is described as a two-step process only for ease of comprehension and is not limited to or by a particular number of steps. Accordingly, the first general step (steps 202-208) may entail generating multiple candidates for display based on web entries, displaying the candidates, and determining click-through rates for the displayed candidates. This step may occur over a threshold period of time or a threshold number of displays of content, in addition to other metrics.

The second general step (steps 210-212), includes using the click-through rates to rank the candidates. The top-ranked candidates would then be included in a display pool of candidates that may be displayed going forward. Thereafter, as the set of candidates to display are being displayed on a web page being accessed by client or user devices 102, additional web entries may be added to databases 108. Receiving additional web entries may prompt the updating of the display pool of candidates.

In an embodiment, responsive to receiving additional web entries, the displayed pool of candidates is updated by first generating additional candidates that also include the new web entries. The newly generated additional candidates may then be displayed along with a current set of candidates from the display pool of candidates. Thereafter, based on an ongoing determination of click-through rates, the display pool of candidates may be constantly or periodically updated, whereby previous candidates may be removed and additional candidates may be added. For example, once new additional candidates are generated, candidates from the display pool of candidates based on a last iteration may be shown to, e.g., 85% of visitors and new candidates generated based on the new web entries may be displayed to the remaining 15% of the traffic to the web page. At the end of the evaluation period, whether it is based on a period of time or a number of displays, the click-through rates for the new candidates are compared to the click-through rates for candidates from the previous display pool of candidates. If the new candidates perform better than any of the candidates from the display pool of candidates, then the display pool of candidates may be updated by adding the better performing additional candidates to the display pool of candidates. In this exemplary scenario, displaying higher click-through rates for the candidates from the display pool of candidates along with the 15% of new candidates allows the displayed candidates to remain fresh and relevant. Specifically, such a percentage breakup allows the display of candidates that are expected to have high-click-through rates and are more relevant while also allowing a mechanism to update the candidates to be displayed based on newer web entries. In additional embodiments, the percentage of new candidates to be introduced during an evaluation period may be higher or lower depending on the number of new web entries and the nature of the topics associated with the web page and/or web entries.

Figure 4:
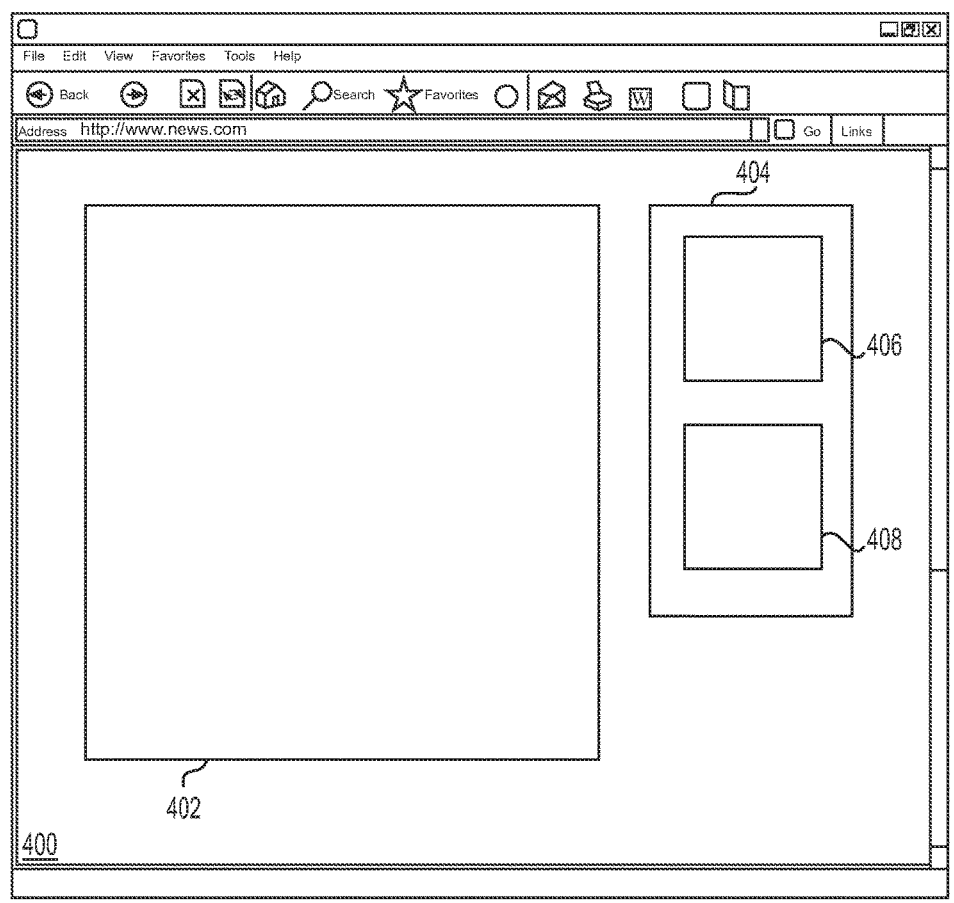
FIG. 4 illustrates an exemplary graphical user interface (GUI), according to an embodiment of the present disclosure.

In further detail, as shown in FIG. 2, step 202 may include retrieving web entries from a database, each web entry of the web entries being a clickable item that is displayed on the one or more user interfaces. For example, a web entry may be a thumbnail comprising an image or text that is displayed alongside an article that is included in a web page displayed in a graphic user interface of a user device. As an example, FIG. 4 displays an exemplary Graphic User Interface (GUI) 400 displayable on client or user devices 102. GUI 400 may be a web page displaying an article 402 alongside candidate 404. Candidate 404 may comprise web entries 406 and 408.

Web entries may be generated based on user-selection, explicit user-generation, or auto-generating using algorithms or pre-determined methods. In some embodiments, web entries may be aggregated from the web or other sources. After generation, web entries may be stored in databases 108 from where optimizing processor 110 may retrieve them.

In step 204, generate a plurality of candidates based on the retrieved web entries, each candidate of the plurality of candidates comprising one or more of the web entries. The plurality of candidates may be generated using various combinations of the plurality of web entries, and may vary in the number of web entries that they contain. For example, some of the candidates may include two web entries each, while the other web entries may include additional web entries. For example, referring back to FIG. 4, exemplary candidate 404 comprises web entries 406 and 408. However, a second exemplary candidate generated at the same time as candidate 404 may comprise three additional web entries along with web entries 406 and 408.

In step 206, provide the plurality of candidates for display on the one or more user interfaces. That is, the generated candidates may be provided to be displayed on user interfaces presented in client or user devices 102. In some embodiments, all of the candidates may be displayed a preset number of times. Alternatively, the candidates may be displayed on a rotating basis over a certain threshold period of time.

In some embodiments, additional metrics may be used to generate candidates. For example, the type of generated candidates may be unique based on types of client or user devices 102. As one example, for client or user devices 102 that are mobile devices or have a relatively smaller screen size, candidates with up to only two web entries may be generated. Alternatively, for client or user devices that have relatively bigger screen sizes, candidates with up to a higher number of web entries may be generated.

In step 208, determine click-through rates for each of the plurality of candidates. That is, data may be received by optimizing processor 110 for each click-through based on the display candidates. Accordingly, optimizing processor 110 may calculate a click-through rate on each candidate based on the number of times a candidate is clicked or selected versus the number of times that the particular candidate is displayed.

Continuing the previous example, the click-through rates may also be specifically calculated for unique types of devices, allowing for analysis that is more accurate and calculation of statistics related to click-through rates.

In step 210, select, from the plurality of candidates, a display pool of candidates to display based on their respective click-through rates. For example, candidates with the highest click-through rates may be selected to be added to a display pool of candidates. In some embodiments, the candidates added to the display pool of candidates may be based on user-selection of a number of highest ranked candidates to utilize, a preset number of highest ranked candidates, or a preset percentage of highest ranked candidates from all candidates.

In other embodiments, candidates may be added to the display pool of candidates based on cut-offs for click-through rates. For example, a threshold click-through rate of ten percent may be pre-set. Accordingly, all entries with a click-through rate higher than ten percent may be included in the display pool of candidates.

In some embodiments, once the display pool of candidates is created, this display pool of candidates may be used as the candidates going forward to be provided to one or more client or user devices 102 for display. Based on the prior history of click-through rates, it is likely that users will find that the candidates included with the display pool of candidates are engaging and relevant.

In some embodiments, the display pool of candidates may be created for unique types of client or user devices 102 based on click-through rates associated with the unique types of client or user devices 102.

In step 212, update the display pool of candidates responsive to retrieving additional web entries from the database. Step 210 is explained in further detail below with respect to FIG. 3.

Thus, method 200 may be used to calculate click-through rates to identify or generate candidates, which may represent a combined click-through rate of all previous users instead of an individualized choice of a person. The calculated click-through rates may be parsed through and analyzed based on particulars about types of devices being used or other relevant factors.

Figure 3:
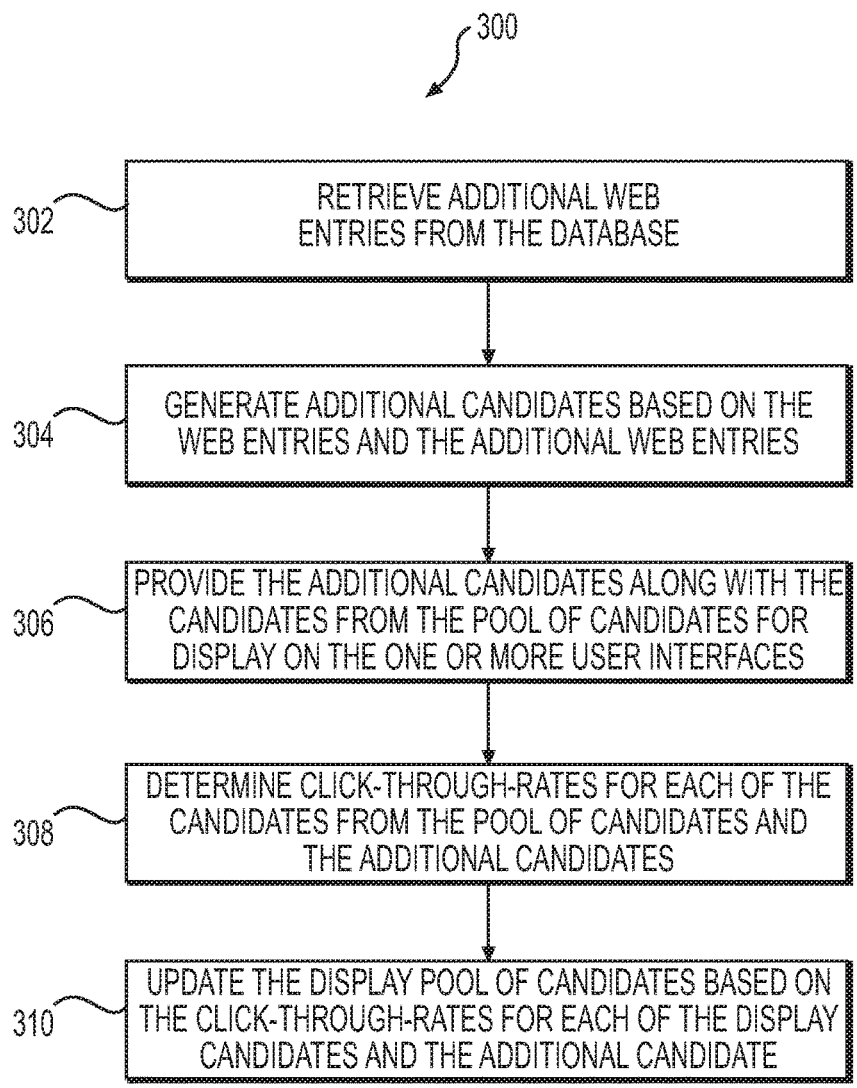
FIG. 3 is a flow diagram of an exemplary method for updating the display pool of candidates responsive to retrieving additional web entries from the database, according to an embodiment of the present disclosure.

FIG. 3 shows a process flowchart for an exemplary method 300 for updating the display pool of candidates responsive to retrieving additional web entries from the database a conversation score. In an embodiment, step 212 of method 200 may be performed using the steps of method 300. As shown in FIG. 3, method 300 includes retrieving additional web entries from the database (step 302). In some embodiments, additional web entries may be retrieved by optimizing processor 110 automatically in response to any new web entries being added to database 110. Alternatively, a user input or a user setting, such as a setting to check for new web entries on a periodic basis, may lead to the retrieval of additional web entries. For example, after a display pool of candidates has been created, any newly breaking news stories or newly generated advertisements may be considered for display to keep content of a web page relevant. Accordingly, additional web entries associated with new content may be added to databases 108 for generation of additional candidates.

In step 304, generate additional candidates based on the web entries and the additional web entries. This step may be performed similarly to step 204 described above. However, step 304 also uses the additional web entries for generating the additional candidates.

In some embodiments, for generating additional candidates, more weight may be given to the additional web entries based on user-selection or pre-determined settings. That is, newly generated candidates may include the additional web entries with higher frequencies than the older web entries.

In other embodiments, for generating additional embodiments, optimizing processor 110 may ignore previous web entries included in previous candidates with low click-through rates. A determination that a candidate had a low click-through rate may be based on a threshold click-through rate, or as a comparative cutoff point to all the other candidates. For example, it may be determined that all candidates with lower than a four percent click-through rate have a "low" click through rate. Alternatively, it may be determined that candidates with the bottom twenty percent of click-through rates out of the pool of all candidates have a "low" click-through rate.

In some embodiments, step 304 may further comprise generating additional candidates based on previously highly performing candidates from a previous generation. For example, web entries from two candidates with the highest click-through rates of a previous generation may be utilized to form the additional candidates. Accordingly, generating such candidates utilizing previously high performing candidates allows for continued optimization of the candidates.

In some embodiments, generating additional candidates based on previously highly performing candidates from a previous generation is not limited to occurring in step 304, but may also or alternatively occur at any point after the first general step (steps 202-208). That is, additional candidates may be generated based on candidates from the display pool of candidates that have high click-through rates. That is, even when no new web entries are added, the candidates in the display pool of candidates may continue to be optimized by utilizing combinations of previously high performing candidates.

In step 306, provide the additional candidates from the pool of candidates for display on the one or more user interfaces along with the candidates. This step may be performed similarly to step 206 described above. As discussed above, the additional candidates may be only a certain percentage of the candidates displayed along with the previous candidates from the pool of candidates. The percentage of additional candidates to display along with candidates from the pool of candidates may be based on a user selection, a pre-determined threshold, a function of the amount of additional candidates, or a combination thereof.

In step 308, determine click-through rates for each of the candidates from the pool of candidates and the additional candidates. This step may be performed similarly to step 306 described above. The period for determining the click-through rates for the candidates from the pool of candidates may be inclusive of any previous iterations of calculating click-through rates. Alternatively, it may be cutoff based on a threshold amount of time or threshold amount of most recent displays.

In step 310, update the display pool of candidates based on the click-through rates for each of the display candidates and the additional candidates. This step may be performed similarly to step 210 described above. That is, updating the display pool of candidates may be similar to the original selection of candidates for the display pool of candidates. Specifically, candidates with higher click-through rates (whether from the previous display pool of candidates or the additional candidates) may be included in the updated display pool of candidates.

Accordingly, in some embodiments, the present iterative method allows the display pool of candidates to be continuously updated while displaying candidates that are most relevant to potential users' interests and that would generate the highest click-through rates.

The examples described above with respect to FIGS. 1-4, or any part(s) or function(s) thereof, may be implemented using hardware, software modules, firmware, tangible computer readable media having instructions stored thereon, or a combination thereof and may be implemented in one or more computer systems or other processing systems.

Figure 5:
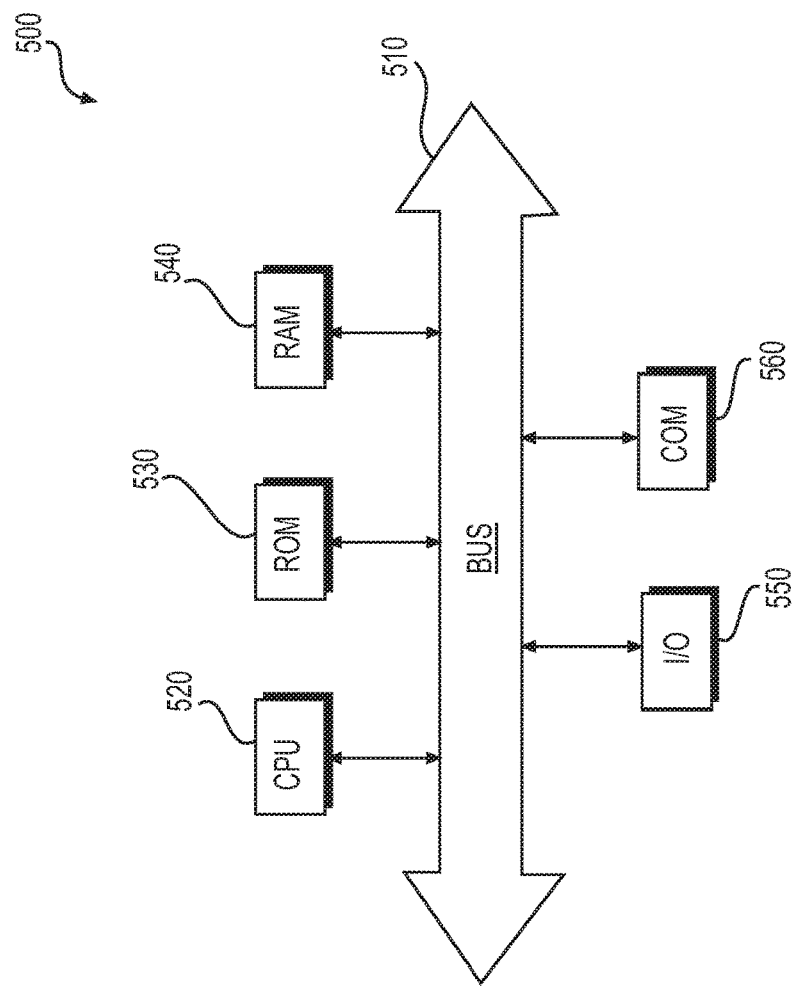
FIG. 5 is a block diagram of an exemplary computer system in which embodiments of the present disclosure may be implemented.

FIG. 5 illustrates a high-level functional block diagram of an exemplary computer system 500, in which embodiments of the present disclosure, or portions thereof, may be implemented, e.g., as computer-readable code. For example, each of the exemplary devices and systems described above with respect to FIG. 1 can be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIG. 1, as described above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-4 may be implemented using computer system 500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 5, computer system 500 includes a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multiprocessor system, such system operating alone, or in a cluster of computing devices operating in a cluster or server farm. CPU 520 is connected to a data communication infrastructure 510, for example, a bus, message queue, network, or multi-core message-passing scheme.

Computer system 500 also includes a main memory 540, for example, random access memory (RAM), and may also include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into computer system 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 500.

Computer system 500 may also include a communications interface ("COM") 560. Communications interface 560 allows software and data to be transferred between computer system 500 and external devices. Communications interface 560 may include a modem, a network interface (such as an Ethernet card), a communications port, a PCM-CIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of computer system 500, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Computer system 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for optimizing displays in one or more user interfaces, the method comprising:
   retrieving web entries from a database, each web entry of the web entries being a clickable item that is displayed on the one or more user interfaces;
   generating a first plurality of candidates based on the retrieved web entries, each candidate of the first plurality of candidates comprising of one or more of the web entries, and wherein each candidate of the first plurality of candidates is generated based on a display size associated with the one or more user interfaces;
   providing the first plurality of candidates for display on at least one of the one or more user interfaces, wherein providing the first plurality of candidates for display is based on the display size associated with the one or more user interfaces;
   determining click-through rates for the first plurality of candidates;
   creating a display pool of candidates to display based on the click-through rates and the display size associated with the one or more user interfaces, wherein the display pool of candidates comprise click-through rates that exceed a predetermined threshold; and
   updating the display pool of candidates responsive to retrieving additional web entries from the database.

2. The computer-implemented method of claim 1, wherein updating the display pool of candidates responsive to retrieving additional web entries from the database comprises:
   generating a second plurality of candidates based on the web entries and the additional web entries;
   providing the second plurality of candidates for display on the one or more user interfaces, wherein the first plurality of candidates are based on a display size associated with the one or more user interfaces;
   determining click-through rates for the second plurality of candidates; and
   updating the display pool of candidates based on the click-through rates for the first and second plurality of candidates and based on the device type associated with the one or more user interfaces.

3. The method of claim 2, wherein generating the second plurality of candidates comprises:
   determining the second plurality of candidates, the second plurality of candidates comprising a first pre-set percentage of candidates from the display pool of candidates and a second pre-set percentage of additional web entries from the database candidates, wherein the first pre-set percentage is higher than the second pre-set percentage.

4. The method of claim 2, wherein creating a display pool of candidates to display comprises:
   ranking the first plurality of candidates against the second plurality of candidates based on the click-through rates; and
   selecting plurality of candidates with the higher rankings to be included in the display pool of candidates.

5. The method of claim 4, wherein determining click-through rates for the first and second plurality of candidates comprises dividing an amount of selection of each of the plurality candidates with an amount of times that each of the plurality of candidates is displayed.

6. The method of claim 2, wherein the first plurality of candidates and the second plurality of candidates comprise a different number of web entries.

7. The method of claim 2, wherein the first plurality of candidates is associated with a first type of user devices, and the second plurality of candidates is associated with a second type of user devices.

8. The method of claim 7, wherein the first type of user device and the second type of user device vary based on at least one of screen size, screen resolutions, and browser specifications.

9. A system for optimizing displays in one or more user interfaces, the system comprising:
   a memory having processor-readable instructions stored therein; and
   a processor configured to access the memory and execute the processor-readable instructions, which when executed by the processor configures the processor to perform a method, the method comprising:
   retrieving web entries from a database, each web entry of the plurality of web entries being a clickable item that is displayed on the one or more user interfaces;
   generating a first plurality of candidates based on the retrieved web entries, each candidate of the first plurality of candidates comprising of one or more of the web entries, and wherein each candidate of the first plurality of candidates is generated based on a display size associated with the one or more user interfaces;
   providing the first plurality of candidates for display on at least one of the one or more user interfaces, wherein providing the first plurality of candidates for display is based on the display size associated with the one or more user interfaces;
   determining click-through rates for the first plurality of candidates;
   creating a display pool of candidates to display based on the click-through rates and the display size associated with the one or more user interfaces, wherein the display pool of candidates comprise click-through rates that exceed a predetermined threshold; and
   updating the display pool of candidates responsive to retrieving additional web entries from the database.

10. The system of claim 9, wherein updating the display pool of candidates responsive to retrieving additional web entries from the database comprises:
    generating a second plurality of candidates based on the web entries and the additional web entries;
    providing the second plurality of candidates for display on the one or more user interfaces, wherein the first plurality of candidates are based on a display size associated with the one or more user interfaces;
    determining click-through rates for the first and second plurality of candidates; and
    updating the display pool of candidates based on the click-through rates for the first and second plurality of candidates and based on the device type associated with the one or more user interfaces.

11. The system of claim 10, wherein generating the second plurality of candidates comprises:
    determining the second plurality of candidates, the second plurality of candidates comprising a first pre-set percentage of candidates from the display pool of candidates and a second pre-set percentage of additional web entries from the database candidates, wherein the first pre-set percentage is higher than the second pre-set percentage.

12. The system of claim 10, wherein creating a display pool of candidates to display comprises:
    ranking the first plurality of candidates against the second plurality of candidates based on the click-through rates; and
    selecting plurality of candidates with the higher rankings to be included in the display pool of candidates.

13. The system of claim 12, wherein determining click-through rates for the first and second plurality of candidates comprises dividing an amount of selection of each of the plurality candidates with an amount of times that each of the plurality of candidates is displayed.

14. The system of claim 10, wherein the first plurality of candidates and the second plurality of candidates comprise a different number of web entries.

15. The system of claim 10, wherein the first plurality of candidates is associated with a first type of user devices, and the second plurality of candidates is associated with a second type of user devices.

16. The system of claim 15, wherein the first type of user device and the second type of user device vary based on at least one of screen size, screen resolutions, and browser specifications.

17. A non-transitory computer-readable medium storing instructions, then instructions, when executed by a computer system cause the computer system to perform a method, the method comprising:
    retrieving web entries from a database, each web entry of the web entries being a clickable item that is displayed on the one or more user interfaces;
    generating a first plurality of candidates based on the retrieved web entries, each candidate of the first plurality of candidates comprising of one or more of the web entries, and wherein each candidate of the first plurality of candidates is generated based on a display size associated with the one or more user interfaces;
    providing the first plurality of candidates for display on at least one of the one or more user interfaces, wherein providing the first plurality of candidates for display is based on the display size associated with the one or more user interfaces;
    determining click-through rates for the first plurality of candidates;
    creating a display pool of candidates to display based on the click-through rates and the display size associated with the one or more user interfaces, wherein the display pool of candidates comprise click-through rates that exceed a predetermined threshold; and
    updating the display pool of candidates responsive to retrieving additional web entries from the database.

18. The non-transitory computer-readable medium of claim 17, wherein updating the display pool of candidates responsive to retrieving additional web entries from the database comprises:
    generating a second plurality of candidates based on the web entries and the additional web entries;
    providing the second plurality of candidates for display on the one or more user interfaces, wherein the first plurality of candidates are based on a display size associated with the one or more user interfaces;
    determining click-through rates for the first and second plurality of candidates; and
    updating the display pool of candidates based on the click-through rates for the first and second plurality of candidates and based on the device type associated with the one or more user interfaces.

19. The non-transitory computer-readable medium of claim 18, wherein generating the second plurality of candidates comprises:

determining the second plurality of candidates, the second plurality of candidates comprising a first pre-set percentage of candidates from the display pool of candidates and a second pre-set percentage of additional web entries from the database candidates, wherein the first pre-set percentage is higher than the second pre-set percentage.

20. The non-transitory computer-readable medium of claim 18, wherein creating a display pool of candidates to display comprises:
   ranking the first plurality of candidates against the second plurality of candidates based on the click-through rates; and
   selecting a plurality of candidates with the higher rankings to be included in the display pool of candidates.

* * * * *